US011391290B2

(12) United States Patent
Tan-Kim et al.

(10) Patent No.: US 11,391,290 B2
(45) Date of Patent: Jul. 19, 2022

(54) TURBOMACHINE COMPRISING A MEANS OF UNCOUPLING A FAN

(71) Applicant: SAFRAN AIRCRAFT ENGINES, Paris (FR)

(72) Inventors: Alexandre Tan-Kim, Moissy-Cramayel (FR); Julien Fabien Patrick Becoulet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/728,992

(22) Filed: Dec. 27, 2019

(65) Prior Publication Data

US 2020/0149542 A1 May 14, 2020

Related U.S. Application Data (60) Division of application No. 15/390,353, filed on Dec. 23, 2016, now abandoned, which is a
(Continued)

(30) Foreign Application Priority Data

Jun. 25, 2014 (FR) ...................... 1455939

(51) Int. Cl.
*F04D 29/054* (2006.01)
*F02C 7/36* (2006.01)
(Continued)

(52) U.S. Cl.
CPC ............. *F04D 29/054* (2013.01); *F01D 5/02* (2013.01); *F01D 15/12* (2013.01); *F01D 21/003* (2013.01);
(Continued)

(58) Field of Classification Search
CPC .... F04D 29/054; F04D 25/045; F04D 29/325; F04D 29/388; F02C 7/36; F02C 3/113;
(Continued)

(56) References Cited

U.S. PATENT DOCUMENTS 4,452,567 A * 6/1984 Treby ...................... F01D 5/026
415/9
4,871,296 A * 10/1989 Laessle ................... F02C 7/277
415/123

(Continued)

FOREIGN PATENT DOCUMENTS

EP 2 048 330 A2 4/2009
GB 2 377 731 A 1/2003
(Continued)

OTHER PUBLICATIONS

Japanese Office Action received in corresponding Japanese Application No. 2016-574387, filed Dec. 21, 2016, dated May 28, 2019, 21 pages.

(Continued)

*Primary Examiner* — Dominick L Plakkoottam
(74) *Attorney, Agent, or Firm* — Christensen O'Connor Johnson Kindness PLLC (57) ABSTRACT

A turbomachine includes a fan shaft driven by a turbine shaft via a device for reducing a speed of rotation. The turbomachine includes an uncoupling device interposed between the reduction device and the turbine shaft. The uncoupling device is configured to uncouple the reduction device and the turbine shaft in response to the exceeding of a determined resistant torque exerted by the reduction device on the turbine shaft.

26 Claims, 7 Drawing Sheets

Related U.S. Application Data continuation-in-part of application No. PCT/FR2015/051614, filed on Jun. 17, 2015.

(51) Int. Cl.
*F01D 21/04* (2006.01)
*F02K 3/06* (2006.01)
*F01D 5/02* (2006.01)
*F01D 15/12* (2006.01)
*F01D 21/00* (2006.01)
*F01D 21/06* (2006.01)
*F04D 25/04* (2006.01)
*F04D 29/32* (2006.01)
*F04D 29/38* (2006.01)
*F02C 3/113* (2006.01)

(52) U.S. Cl.
CPC .......... *F01D 21/045* (2013.01); *F01D 21/06* (2013.01); *F02C 3/113* (2013.01); *F02C 7/36* (2013.01); *F02K 3/06* (2013.01); *F04D 25/045* (2013.01); *F04D 29/325* (2013.01); *F04D 29/388* (2013.01); *F05D 2220/32* (2013.01); *F05D 2240/60* (2013.01); *F05D 2260/311* (2013.01); *F05D 2260/4031* (2013.01); *F05D 2260/40311* (2013.01); *Y02T 50/60* (2013.01)

(58) Field of Classification Search
CPC .......... F01D 21/045; F01D 5/02; F01D 15/12; F01D 21/003; F01D 21/06; F02K 3/06; Y02T 50/60; F05D 2260/4031; F05D 2260/40311; F05D 2220/32; F05D 2240/60; F05D 2260/311
See application file for complete search history.

(56) References Cited

U.S. PATENT DOCUMENTS

| | | | |
|---|---|---|---|
| 2007/0084183 A1* | 4/2007 | Moniz | F02K 3/072 60/204 |
| 2008/0053257 A1* | 3/2008 | Dusserre-Telmon | F02C 7/32 74/11 |
| 2010/0032678 A1 | 2/2010 | Kim et al. | |
| 2012/0216548 A1* | 8/2012 | McCune | F01D 21/02 60/779 |
| 2013/0014513 A1 | 1/2013 | Barnett et al. | |
| 2013/0022448 A1* | 1/2013 | Jadczak | F01D 25/164 415/34 |
| 2013/0052012 A1 | 2/2013 | Kray et al. | |
| 2013/0283586 A1* | 10/2013 | Franchet | B23K 20/021 29/423 |
| 2013/0324343 A1 | 12/2013 | Gallet | |

FOREIGN PATENT DOCUMENTS

| | | |
|---|---|---|
| JP | H04105635 A | 4/1992 |
| JP | 2007113580 A | 5/2007 |
| JP | 2013044328 A | 3/2013 |

OTHER PUBLICATIONS

International Search Report dated Oct. 14, 2015, issued in corresponding International Application No. PCT/FR2015/051614, filed Jun. 17, 2015, 5 pages.
Written Opinion of the International Searching Authority dated Oct. 14, 2015, issued in corresponding International Application No. PCT/FR2015/051614, filed Jun. 17, 2015, 11 pages.
International Preliminary Report on Patentability dated Dec. 27, 2016, issued in corresponding International Application No. PCT/FR2015/051614, filed Jun. 17, 2015, 1 page.

* cited by examiner

TURBOMACHINE COMPRISING A MEANS OF UNCOUPLING A FAN

CROSS-REFERENCES TO RELATED APPLICATIONS

This application is a division of U.S. patent application Ser. No. 15/390,353, filed Dec. 23, 2016, which is a continuation-in-part of International Application No. PCT/FR2015/051614, filed Jun. 17, 2015, which claims priority to French Application No. 1455939, filed Jun. 25, 2014, the disclosures of which are hereby expressly incorporated by reference in their entirety.

BACKGROUND

The present disclosure relates generally to aeronautical turbomachines and more particularly that of dual flux turbomachines including a reduction device for driving the fan.

Conventionally, turbomachines comprise, starting from the upstream side, one or several compressor modules positioned in series, which compress the air sucked up in an air intake. The air is then introduced into a combustion chamber where it is mixed with fuel and burnt. The combustion gases pass through one or several turbine modules which drive the compressor(s) via associated turbine shafts. The gases are finally ejected either into a nozzle for producing a propelling force either on a free turbine in order to produce power which is recovered on a transmission shaft.

Present dual flow turbomachines with a strong dilution rate includes several compressor stages, notably a low pressure (LP) compressor and a high pressure (HP) compressor, crossed by a primary flow. These low pressure (LP) and high pressure (HP) compressors are each driven by an associated respective low pressure (LP) or high pressure (HP) turbine shaft. Upstream from the low pressure (LP) compressor is positioned a wheel including movable blades or vanes of large dimension, or a fan, which feeds both the primary flow crossing the LP and HP compressors and a cold flow, or secondary flow, which is directly directed towards a cold flow nozzle, a so called secondary nozzle. The fan is driven by the rotation shaft of an LP turbine of the LP body and generally rotates at the same speed as it.

It may be interesting to have the fan rotate at a rotational speed of less than that of the LP shaft, notably when the latter is of a very large size, with the purpose of better adapting it aerodynamically. For this, a reduction device is positioned between the turbine shaft LP and a fan shaft, which bears the fan. Such a configuration is notably described in patent applications FR 1,251,655 and 1,251,656 filed on Feb. 23, 2012.

In this configuration, it may occur that the fan loses a blade, for example in the case of ingestion of a foreign body such as a bird. This phenomenon also called "Fan Blade Out" (FBO) causes off-centering of the fan having the consequence of causing a contact of the ends of its blades with the case of the fan. This contact may suddenly slow down the fan even while the reduction device and the turbine shaft are still driven by the LP turbine, which may generate a high torsional torque in the LP turbine shaft and in the reduction device.

The torsion of the shafts may lead to breakages of the shafts in different points of the turbomachine, as this is taught by document EP-2,048,330-A2.

Document EP-2,048,330-A2 discloses a turbomachine including a fan shaft and a shaft of a compressor each driven by a turbine shaft via two different coupling paths torqued with the turbine shaft at an intersection laid out at a bearing. The coupling path drives the fan via a reduction device. Both coupling paths are provided so that in the case of an incidental breakage of one of the coupling paths, the turbine remains being charged on the other coupling path in order to avoid excess speeds of the turbine, while a control unit of the turbine may reduce the speed of the turbine. The turbomachine described in this document starts from the fact that a possible mechanical malfunction of the coupling paths may occur, such as for example the one which connects the turbine shaft to the fan. However, this document does not explicitly specify the nature of this malfunction, which may consist or not in a break, but which is in any case incidental and not predictable. In the case of a break of the coupling path, of the turbine shaft with the fan, this incidental break then only occurs when the reduction device has already been subject to significant torques and has already likely been damaged.

Indeed, such a torsional torque in the case of a blade loss also risks seriously damaging the reduction device, which then may be blocked and make the rotation of the fan impossible. This would have the consequence of suddenly increasing the aerodynamic drag of the engine, making the airplane impossible to pilot.

In order to find a remedy to this drawback, a solution consists of limiting the torsional torque which may pass through the reduction device and the turbine shaft LP in order to avoid blocking the fan.

Moreover, the limitation of this torque gives the possibility to avoid any over-dimensioning of the members of the reduction device and of the low pressure turbine shaft, and therefore to lighten the design of the reduction device and of the LP turbine shaft.

With this purpose, the present disclosure proposes a turbomachine of the type mentioned earlier, characterized in that it includes at least one uncoupling means interposed between the reduction device and the turbine shaft, which is able of uncoupling the reduction device and the turbine shaft in response to exceeding a determined resistant torque exerted by the reduction device on the turbine shaft.

Advantageously, the uncoupling is therefore an event provided as a response to the exceeding of a determined resistant torque exerted by the reduction device on the turbine shaft, i.e. conditioned by the exceeding of this resistant torque.

SUMMARY

According to preferred embodiments of the invention, the uncoupling means includes at least one fuse connecting element which is interposed between the reduction device and the turbine shaft and which is able to be broken when it is subject to a so called uncoupling resistant torque exerted by the device for reducing speed on the turbine shaft.

According to a first embodiment of the uncoupling means, the fuse element consists of a segment of an input shaft of the reduction device bound to the turbine shaft, said segment being able to be broken when it is subject to a maximum torsional torque corresponding to the uncoupling resistant torque.

According to a second embodiment of the uncoupling means, an input shaft of the reduction device includes a tubular end segment which is coupled with a complementary tubular end segment of the turbine shaft via at least one radial element able to be broken when it is subject to a shear stress corresponding to the resistant uncoupling torque.

In this configuration, the radial element includes a pin which is received in a radial orifice of the end segment of the input shaft and in an orifice facing the end segment of the turbine shaft.

The reduction device can be coupled to the turbine shaft via a coupling with trapezoidal teeth of the curvic type, including two toothed coupling plates meshing with one another and fastened to one another via screws. According to a third embodiment of the uncoupling means, these screws are axial fuse screws forming fuse connecting elements of the uncoupling means.

In a preferential way of the invention, the fuse connecting element is able to be broken as soon as it is subject to the determined resistant uncoupling torque corresponding to a resistant torque exerted by the fan on the speed reduction device in the case of loss of at least one blade of a fan driven by said fan shaft.

Moreover, the fuse connecting element is able to be broken as soon as it is subject to a resistant torque which is strictly greater than any torque corresponding to a resistant torque exerted by the fan on the speed reduction device in the case of ingestion of a bird without losing any blade by said fan.

The fuse connecting element may be associated with a fan including metal blades. In this case, the fuse element is able to be broken as soon as it is subject to an uncoupling torque of 120 to 140% of a normal torque in a maximum speed of the turbomachine.

Also, the fuse connecting element may be associated with a fan including blades in a composite material. In this case, the melting element is able to be broken as soon as it is subject to an uncoupling torque of 130 to 170% of a normal torque in a maximum speed condition of the turbomachine.

Finally, in order to avoid run-off of the turbines in the case of uncoupling, the turbomachine according to the invention advantageously includes means for detecting the uncoupling of the reduction device and of the turbine shaft able to control a reduction of speed of the turbine and/or stopping of the turbomachine.

Preferably, the resistant uncoupling torque is greater than 50,000 N·m, and preferably comprised between 50,000 N·m and 400,000 N·m.

According to an alternative embodiment of the invention, the turbomachine includes an additional uncoupling means interposed between the reduction device and the fan shaft, which is able to uncouple the reduction device and the fan shaft in response to exceeding a determined resistant torque, called uncoupling torque, exerted by the fan shaft on the reduction device.

The additional uncoupling means includes at least one fuse connecting element which is interposed between the reduction device and the fan shaft and which is able to be broken when it is subject to the uncoupling resistant torque exerted by the fan shaft on the reduction device.

According to a first embodiment of this additional uncoupling means, the fuse element consists of a segment of an output shaft of the reduction device bound to the fan shaft, said segment being able to be broken when it is subject to a maximum torsional torque corresponding to the uncoupling resistant torque.

According to a first embodiment of this additional uncoupling means, an output shaft of the reduction device includes a tubular end segment which is coupled with a complementary tubular end segment of the fan shaft via at least one radial fuse connecting element able to be broken when it is subject to a shear stress corresponding to the resistant uncoupling torque.

Preferably, the radial element includes a pin which is received in a radial orifice of the end segment of the output shaft and in an orifice facing the end segment of the fan shaft.

The reduction device can be coupled to the fan shaft via a coupling with trapezoidal teeth of the curvic type, including two toothed coupling plates with trapezoidal axial teeth meshing with one another and fastened to one another via axial screws. According to a third embodiment of this additional uncoupling means, the screws are fuse screws forming the fuse connecting element of the additional uncoupling means.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

In the description which follows, identical reference numbers designate identical parts or having similar functions.

DETAILED DESCRIPTION

Figure 1:
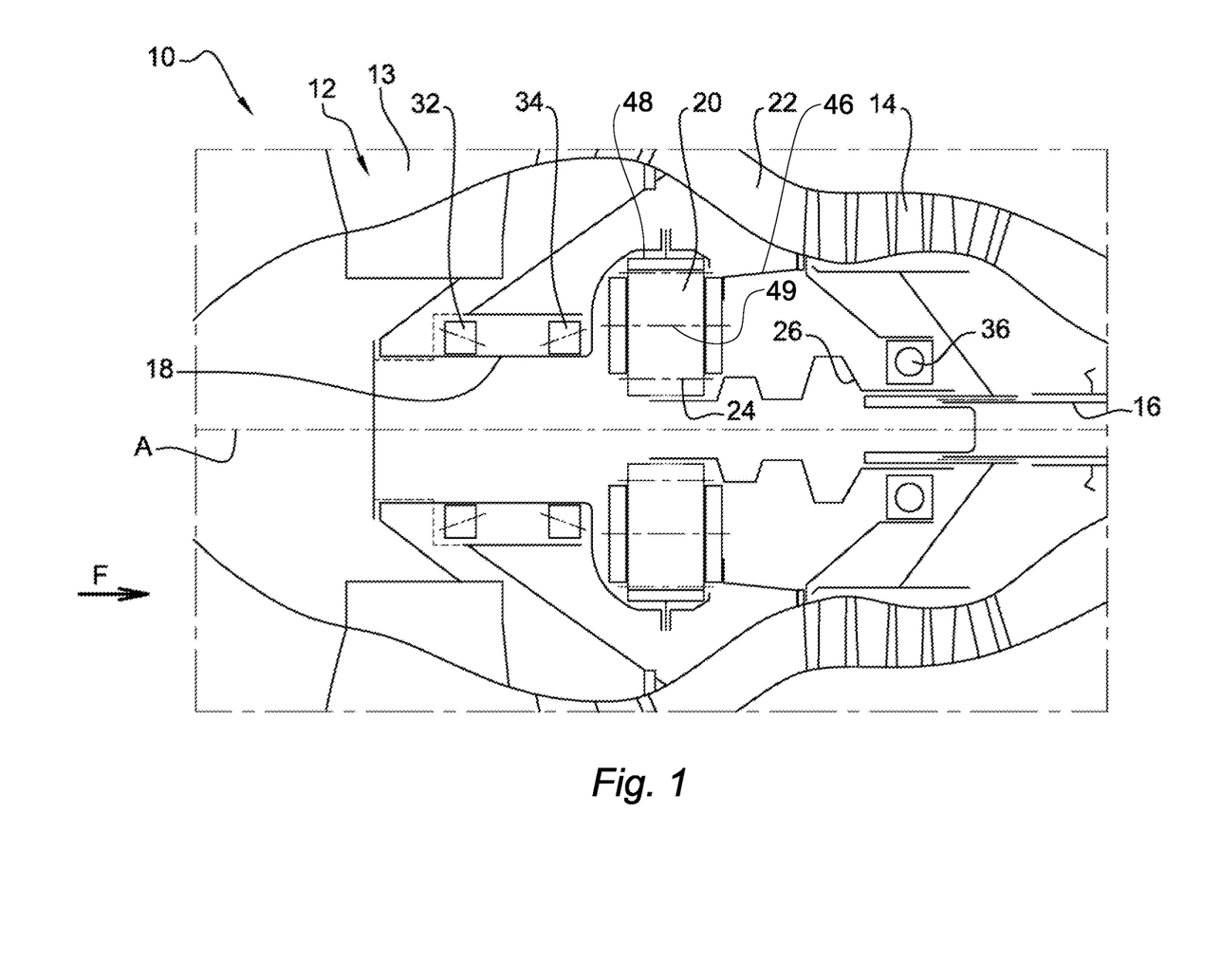
FIG. 1 is an overall view of a turbomachine according to a prior state of the art.

In FIG. 1 is illustrated a turbomachine such as a turbine engine 10 made according to a prior state of the art. In a known way, the turbine engine 10 includes, from the upstream side to the downstream side along the gas flow flux "F", a fan 12, a low pressure compressor 14, a high pressure compressor, a combustion chamber, a high pressure turbine and a low pressure turbine (not shown). The fan 12 includes blades 13. The high pressure compressor and the high pressure turbine are connected through a high pressure shaft and form with it a high pressure body. The low pressure compressor 14 and the low pressure turbine are connected through a low pressure shaft 16 and form with it a low pressure body. The fan 12 as for it is borne by a fan shaft 18 which, in the illustrated example, is bound in rotation to the LP shaft 16, through a device 20 for reducing the speed of rotation between both shafts 16, 18.

Indeed, it is interesting to have the fan 12 rotated at a speed of rotation of less than that of the LP shaft 16, notably when the latter is of a very large size, with the purpose of better adapting it aerodynamically.

The HP and LP shafts 16 extend along an axis "A" of rotation of the turbine engine 10.

The turbine engine 10 also comprises, conventionally, a fan case (not shown) which allows channeling of the gases sucked up by the fan 12 towards a vein 22 of a primary flow, which crosses the LP and HP bodies, and a secondary flow vein (not shown) which surrounds a case of the LP and HP bodies and joins up with the primary flow vein in a nozzle (not shown) of the turbine engine.

As illustrated by FIG. 1, the reduction device 20 is positioned between the fan shaft 18 and the LP shaft 16. This reduction device, for example of the epicycloidal type is illustrated in the schematic form of rectangles only showing its congestion. It is, non-limitingly with respect to the invention, driven by a planetary pinion 24 (shown by the outline of its teeth) borne by an input shaft 26 which is connected in rotation to the LP shaft 16, the shaft 16 being, only as an example, received without any play by being fitted into the shaft 26. It also includes a planet carrier 49 (shown by the axis of its planet gears) secured to a case 46 of the turbomachine, and a crown 48 that drives the shaft 18 of the fan 12.

In this configuration, it may occur that the fan 12 loses a blade 13, for example in the case of ingestion of a foreign body such as a bird or subsequently to a fatigue break resulting from unsuitable maintenance. This phenomenon, also known as "Fan Blade Out" (FBO) causes off-centering of the fan 12 relatively to the axis "A", which has the consequence of causing a contact of the ends of its blades 13 with the case (not shown) of the fan 12. This contact may suddenly slow down the fan 12 even while the reduction device 20 and the LP turbine shaft 16 are still driven by the LP turbine, which may create a high torsional torque in the LP turbine shaft 16 and in the reduction device 20.

Such a torsional torque in the case of loss of a blade 13 risks seriously damaging the reduction device 20, which then may be blocked and make the rotation of the fan 12 impossible. This would have the consequence of suddenly increasing the aerodynamic drag of the engine, making the airplane impossible to pilot.

In order to find a remedy to this drawback, a solution consists of limiting the torsional torque which may pass through the reduction device 20 and the LP turbine shaft 16, in order to avoid blocking of the fan 12.

The limitation of the torsional torque has another advantage, which is to give the possibility of avoiding over-dimensioning of the members of the reduction device 20 and of the LP turbine shaft 16 able to ensure their resistance to such a torsional torque during exceeding of a determined resistant torque exerted by the speed reduction device 20 on the turbine shaft 16.

Moreover, the limitation of this torque gives the possibility of avoiding any over-dimensioning of the members of the reduction device 20 and of the low pressure turbine shaft 16, and therefore alleviating the design of the reduction device 20 and of the LP turbine shaft 16.

With this purpose, the invention proposes a turbomachine of the type described earlier, characterized in that it includes an uncoupling means 28 interposed between the reduction device 20 and the turbine shaft 16, which is able to uncouple the reduction device 20 from the turbine shaft in response to the exceeding of a determined resistant torque, called uncoupling torque, exerted by the speed reduction device 20 on the turbine shaft 16.

Figure 2A:
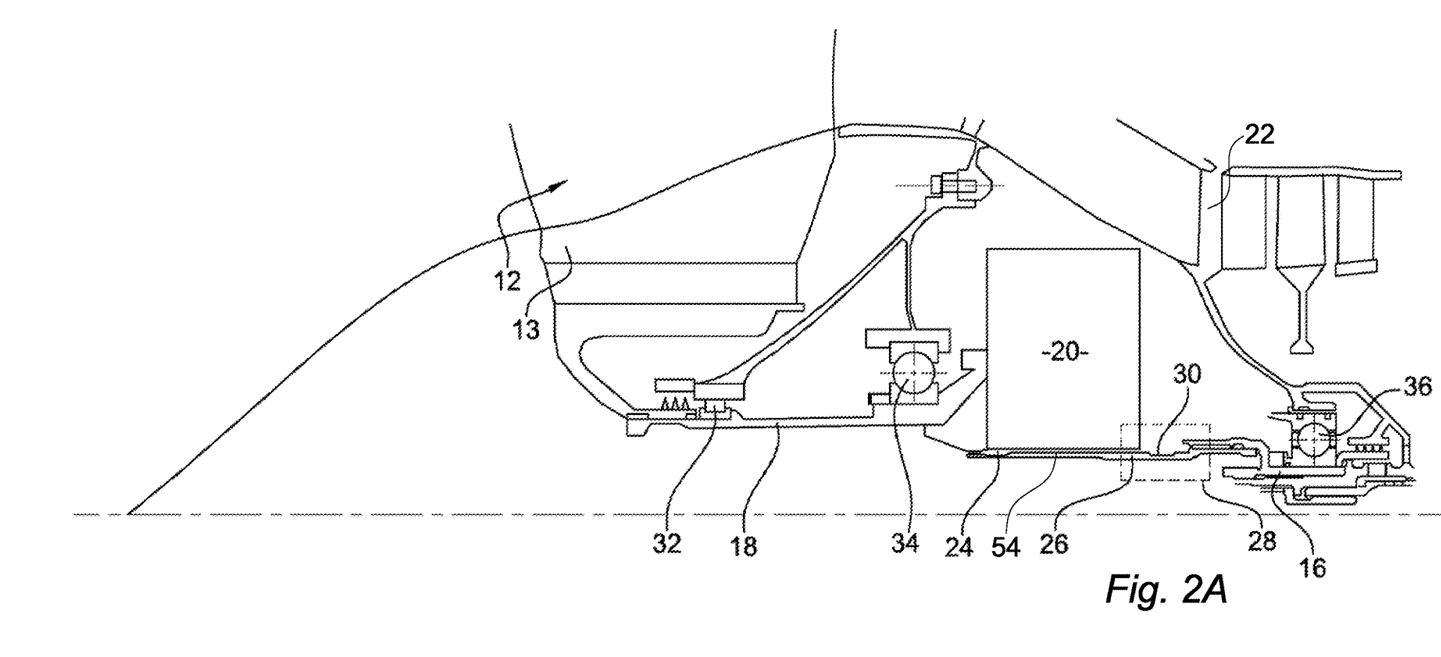
FIG. 2A is a sectional view of the front portion of a turbomachine according to the invention equipped with a first embodiment of an uncoupling means.
Figure 3A:
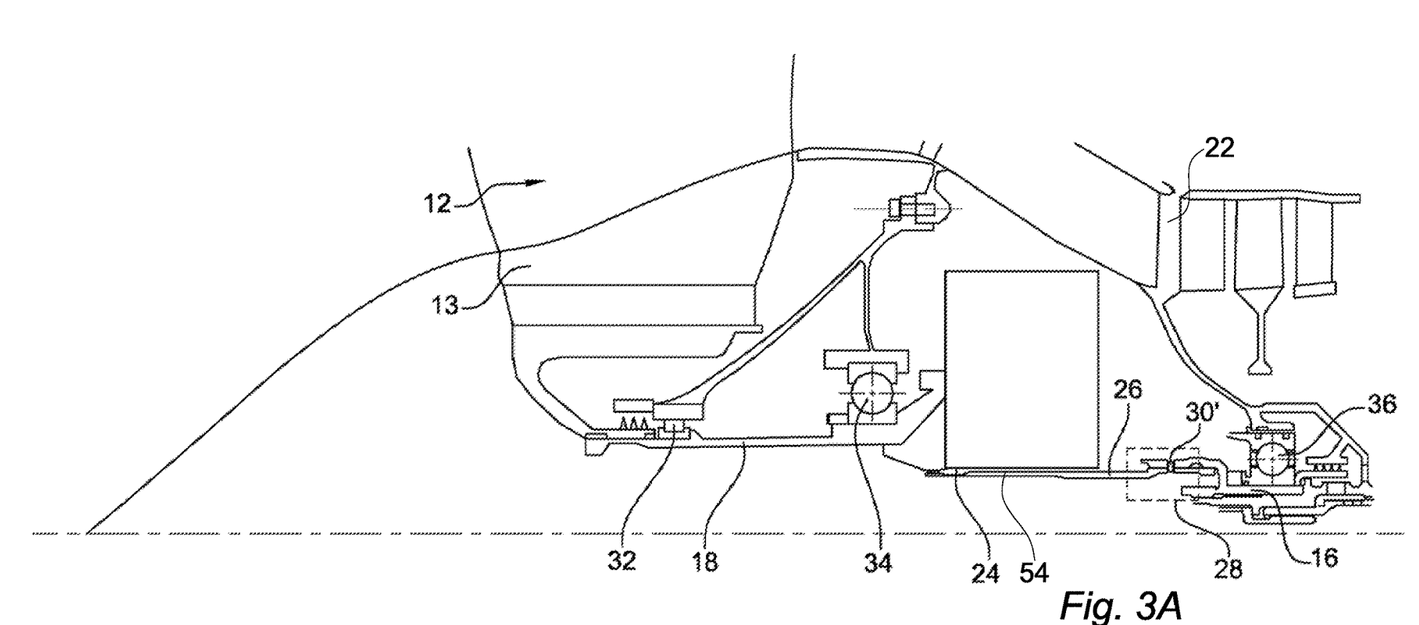
FIG. 3A is a sectional view of the front portion of a turbomachine according to the invention equipped with a second embodiment of an uncoupling means.
Figure 8A:
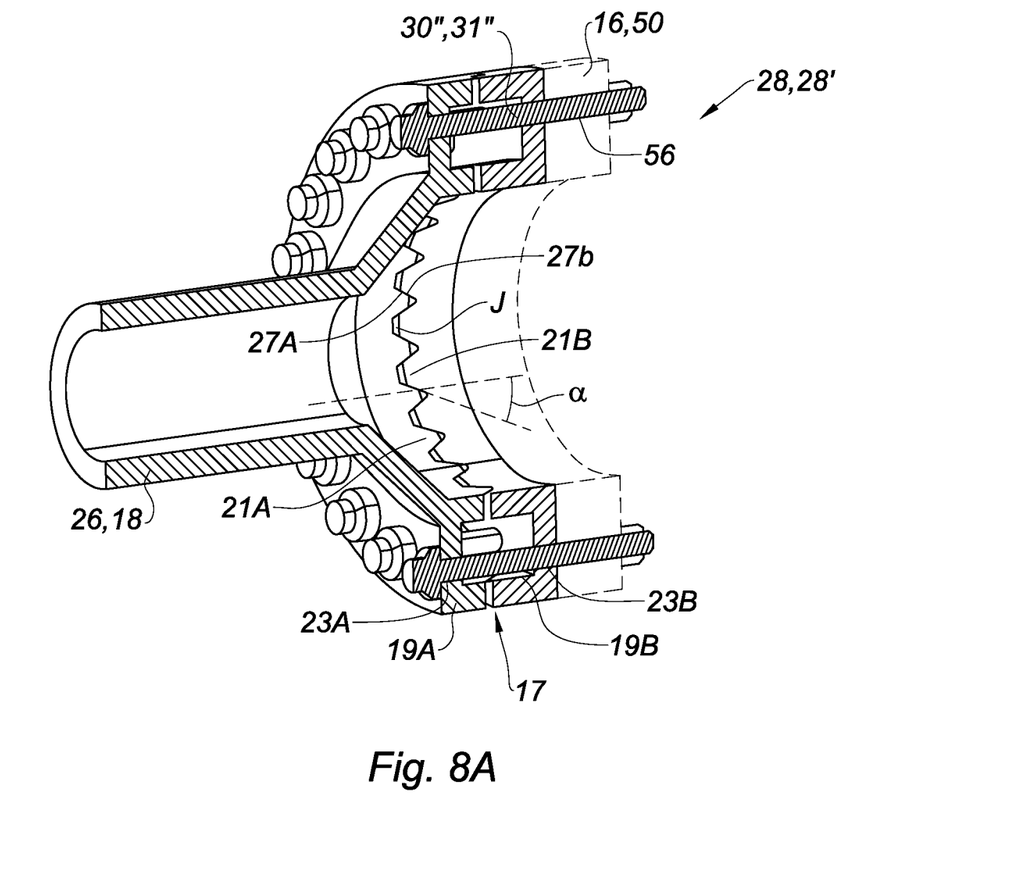
FIG. 8A is a perspective view of a third embodiment of the uncoupling means or the additional uncoupling means.

More particularly, as illustrated by FIGS. 2A, 3A and 8A, the uncoupling means 28 includes at least one fuse connecting element 30, 30', 30" which is interposed between the reduction device 20 and the turbine shaft 16 and which is able to be broken when it is subject to the resistant torque a so called uncoupling torque exerted by the speed reduction device on the turbine shaft, and which notably corresponds to a determined resistant torque exerted by the fan 12 on the speed reduction device 20, and then transmitted through said speed reduction device.

Benefitting from the positioning of at least one fuse connecting element 30, 30', 30" between the reduction device 20 and the turbine shaft 16 has several advantages.

Firstly, this positioning of the fuse connecting element 30, 30', 30" between the reduction device 20 and the turbine shaft 16 is easy to achieve at the reduction device 20 since the shaft 18 of the fan 12 is supported by two bearings 32, 34, and since the shaft 16 of the LP turbine is itself also supported by two bearings, a single bearing 36 of which has been illustrated in FIGS. 2A, 3A. The breaking of the fuse element 30, 30' therefore has no incidence on the maintaining in rotation of the shaft 16 of the LP turbine or the shaft 18 of the fan 12.

Secondly, the uncoupling of the reduction device 20 and of the turbine shaft 16 involves a free speed of rotation of the fan 12 after stopping the turbine engine that is greater than that which the same fan 12 would have in a conventional turbine engine wherein the turbine engine would be stopped without uncoupling the fan 12. Thus, the fan 12 is subject to a free speed of rotation or "wind-milling" which allows the turbine engine to only produce a reduced drag.

Thirdly, the positioning of the fuse connecting element 30, 30', 30" between the reduction device 20 and the turbine shaft 16 allows, as this will be seen later on in the continuation of the present description, protection of the reduction device 20 in the case of excess speed of the shaft 16 of the turbine.

Figure 2B:
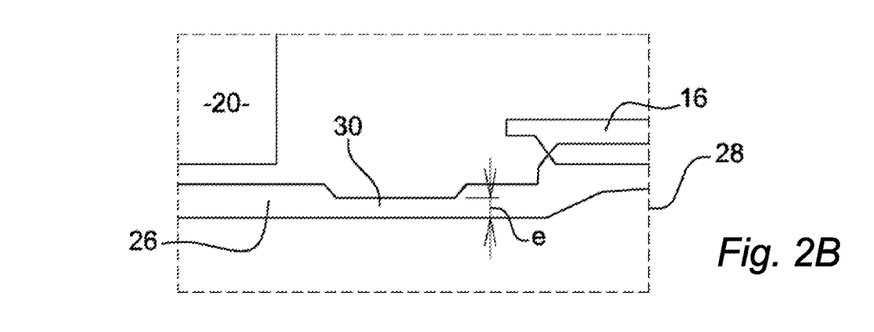
FIG. 2B is a detailed view of FIG. 2A.

According to a first embodiment of the decoupling device 28 which was illustrated in FIG. 2A and in particular in FIG. 2B, the fuse element consists of a segment 30 of the input shaft 26 of the reduction device bound to the shaft 16 of the turbine. This segment 30 is able to be broken when it is subject to a maximum torsional torque corresponding to the determined uncoupling resistant torque exerted by the reduction device 20 on the shaft 16.

Any known solution of the state of the art may be suitable for properly producing a segment 30 with reduced torsional rigidity. In particular, the segment may be a tubular segment with reduced thickness "e", as illustrated in FIG. 2A. This may also be an open-worked segment 30 and/or including areas for initiating the break (not shown).

Figure 3B:
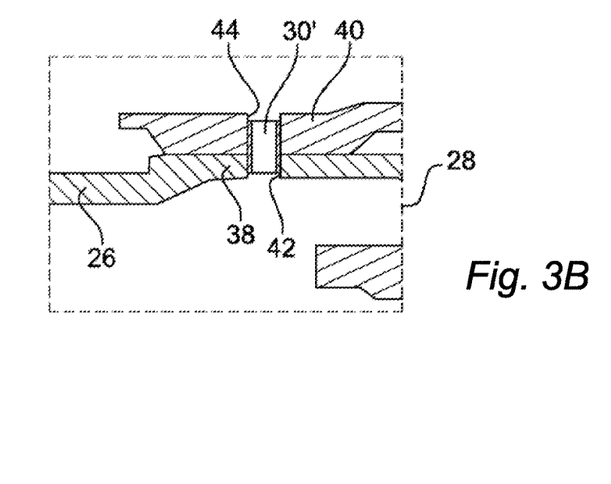
FIG. 3B is a detailed view of FIG. 3A.

According to a second embodiment of the uncoupling device 28 which has been illustrated in FIG. 3A and in particular in FIG. 3B, the input shaft 26 of the reduction device includes a tubular end segment 38 which is uncoupled with a complementary tubular end segment 40 of the turbine shaft 16 via at least one radial element 30, forming the fuse connecting element. This radial element 30' is able to be broken when it is subject to a shear stress corresponding to the resistant uncoupling torque.

It will be understood that the radial element 30' forming the fuse element may be conformed according to many embodiments. However, in a preferential way of the invention, the radial element 30' consists of a pin, notably a cylindrical pin which is received in a radial orifice 42 of the end segment of the input shaft 26 and into an orifice 44 facing the end segment of the shaft 16 of the turbine.

In each of these two embodiments, it will be understood that the positioning of the fuse connecting element 30, 30' on the input shaft gives the possibility of ensuring support of the planetary gear 24 of the reduction device after uncoupling.

Indeed, the planetary gear 24 is supported via the satellite-bearer with the output shaft (not shown) of the reduction device 20.

According to a third embodiment of the uncoupling device 28 which has been illustrated in FIG. 8A, the reduction device 20 is coupled to the turbine shaft 16 via a coupling 17 with trapezoidal teeth of the "curvic" type. Such a coupling, known from the state of the art, is conventionally used in turbomachines to couple trunnions, the juxtaposition of which forms the high-pressure shaft.

Figure 8B:
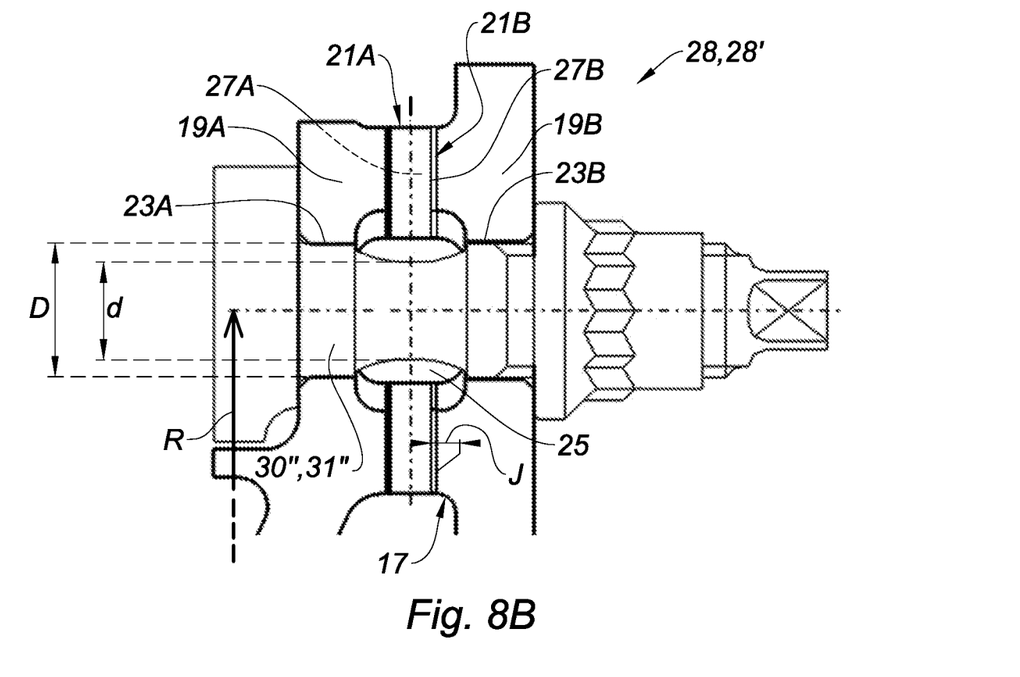
FIG. 8B is a detailed sectional perspective view of a third embodiment of the uncoupling means or the additional uncoupling means prior to uncoupling.

In the context of the third embodiment of the uncoupling device 28 of the invention, this coupling 17 is used differently here, since it is inserted between the input shaft 26 of the reduction gear 20 and the turbine shaft 16. It includes two toothed coupling plates 19A, 19B including trapezoidal teeth 21A, 21B, whereof the direction of the height of the corresponding trapezoids is oriented parallel to the axial direction, and which mesh with one another. The teeth 21A, 21B have inclined planes 27A, 27B arranged in contact with one another. The plates 19A, 19B are joined to one another by axial screws. As illustrated in FIGS. 8A and 8B, a functional clearance J is arranged between the ends of the teeth 21A and the bottoms of the teeth 21B to guarantee good contact between the inclined planes 27A, 27B.

According to the invention, the screws are axial fuse screws 30" that traverse piercings 23A, 23B arranged substantially along an intermediate radius R of the teeth 21A, 21B, substantially at the middle of said teeth. The axial fuse screws 30" each form the fuse connecting element 30" of the uncoupling means 28. To that end, the screws 30" are tightened with a determined tightening torque that does not risk causing them to break.

Figure 8C:
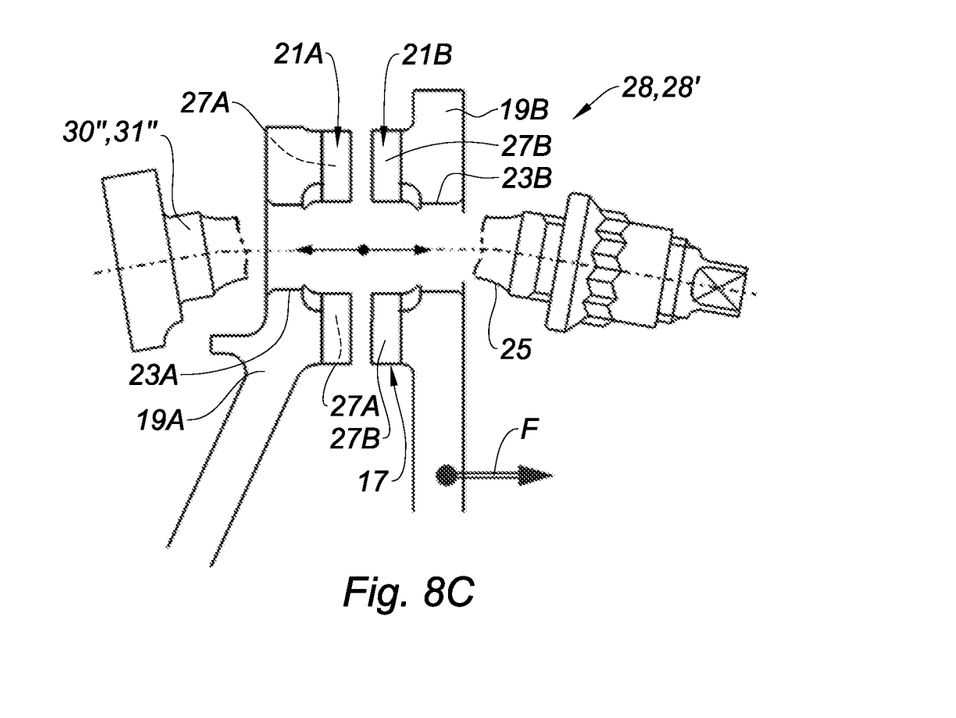
FIG. 8C is a detailed sectional view of the third embodiment of the uncoupling means or the additional uncoupling means during uncoupling.

More particularly, as illustrated in FIG. 8B, the axial fuse screws 30", with primary diameter "D", each include a segment 25 with a reduced diameter "d" forming a break primer. As illustrated in FIG. 8C, when such a coupling undergoes a torsional torque between its two plates 19A, 19B, the trapezoidal teeth 21A, 21B, via their inclined faces 27A, 27B, convert the forces resulting from the torsional torque into a resultant axial force F between the plates 19A, 19B that is exerted in the form of a traction force on the screws 30". This traction force results in causing the screws 30" to break at their segments 25 with a smaller diameter. The number of screws 30" and their diameter depend on the value of the uncoupling torque $C_D$.

In the case of a reduction gear of the planetary or epicycloidal type, the input shaft 26 is mounted in a sun gear of this reduction gear via a set of complementary splines similar to the set of splines 54 that was shown as an illustration in FIGS. 2A and 3A. This set of splines more particularly includes splines (not shown) inside the sun gear 24 that receive outer splines (not shown) of the input shaft 26. The inner splines allow the input shaft 26 to slide in the sun gear 24. The forces resulting from the torsional torque exerted between the plates 19A, 19B cause a resultant axial force between these plates 19A, 19B that results in causing their separation. This separation continues after the fuse screws 30" break during the separation of the plates 19A, 19B. The possibility of sliding offered by the complementary splines of the sun gear 24 and the input shaft 26 of the reduction gear allow the axial separation of the input shaft 26 and the low-pressure turbine shaft 16.

In each of these three embodiments, the fuse element 30, 30', 30" is calibrated so as to break when respectively the segment 30, the pin 30', or each screw 30" is subject to an uncoupling torque corresponding to a resistant torque exerted by the fan on the speed reduction device 20 in the case of loss of at least one blade 13 of the fan driven by said fan shaft 18, and transmitted by the reduction device 20.

Thus, the break is provided as a minimum and this, as soon as the loss of a single blade 13.

It is also possible to choose another break criterion of the fuse connecting element 30, 30', 30", for example seizing of the reduction gear 20. In this case, the torque $C_D$ is situated in a range from 200% to 300% of the maximum torque to which the turbine shaft 12 is subjected.

Conversely, it is provided that the break only occurs in the case of break or loss of a blade 13, and not in the case of a simple slowing down of the fan 12.

Thus, it is provided that the determined resistant torque be strictly greater than any torque corresponding to a resistant torque exerted by the fan 12 on the speed reduction device 20 and transmitted through the device 20, in the case of ingestion of a bird without any loss of a blade by said fan 12, such an event may produce a tangential force slowing down the fan 12, but which does not risk damaging the reduction device 20 or blocking the relevant kinematical chain.

Figure 4:
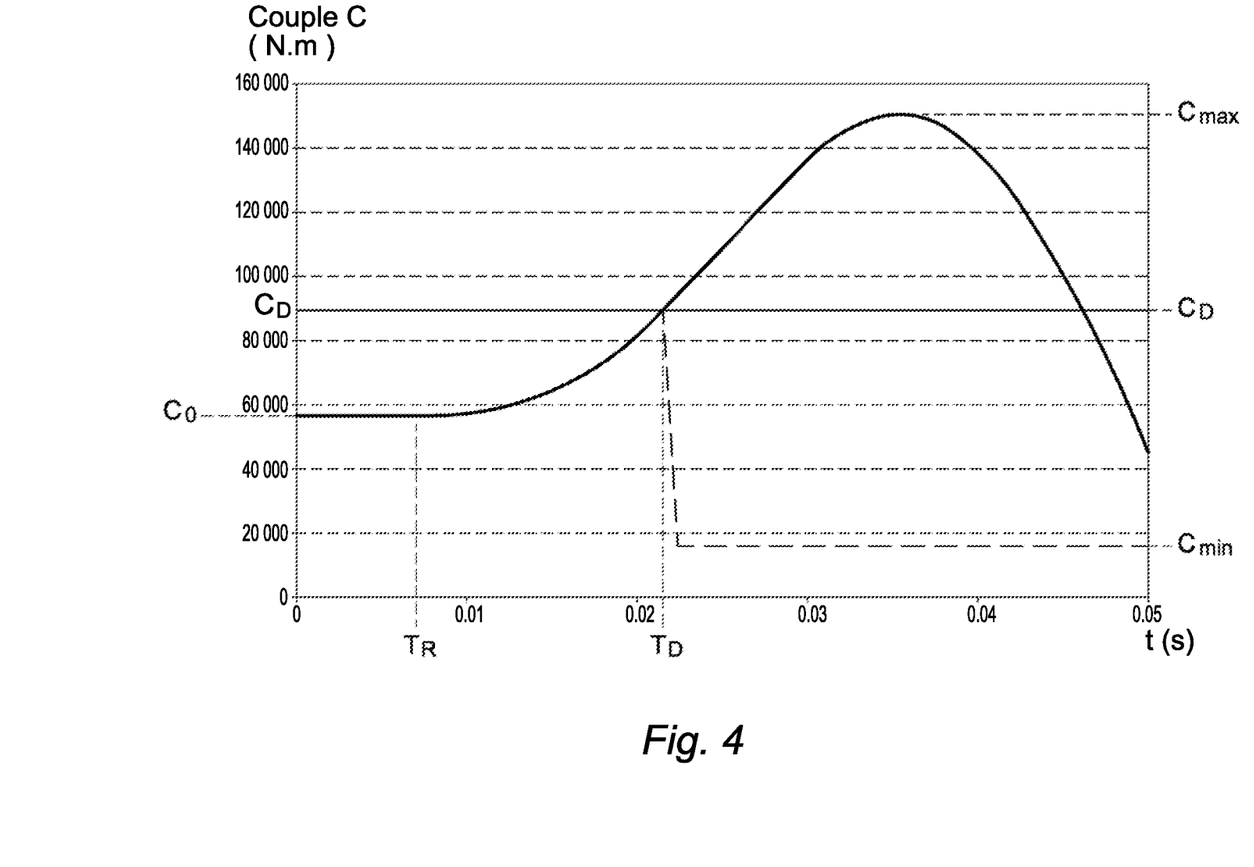
FIG. 4 is a diagram illustrating the resistant torque exerted by the speed reduction device on the turbine shaft versus time during the loss of a blade of the fan.

FIG. 4 comparatively illustrates the transmitted resistant torque "C", in ordinates, versus the time "t" in abscissas, in the case of break of a blade 13 of the fan.

As this may be seen on the curve in solid lines, in a conventional turbomachine, from an optimal operating torque $C_0$, a break of a blade 13 may occur at an instant $T_R$. This break leads to an increase in the resistant torque up to a limiting value $C_{max}$ corresponding to the blocking of the reduce device 20 and of the fan 12, or more exactly to a risk of blocking according to the specifications of the reduction device, making the latter unable to be used.

In the turbomachine according to the invention, the maximum torque is tared with a couple $C_D$ or uncoupling torque. Consequently, during operation, a break of a blade 13 may also occur at an instant $T_R$ which leads to an increase in the resistant torque up to the value $C_D$ or uncoupling torque value. The torque decreases then, according to the curve in dotted lines, down to a value $C_{min}$ corresponding to a state of free rotation of the fan 12.

As an example, and in a non-limiting way of the invention, an order of magnitude of the determined transmitted uncoupling torque $C_D$, when the fan includes metal blades, is of 120 to 140% of a normal torque in the maximum speed conditions of the turbomachine.

When the fan includes blades in a composite material, an order of magnitude of the determined transmitted uncoupling torque is from 130 to 170% of a normal torque under maximum speed conditions of the turbomachine.

As just one non-limiting example of the invention, we will preferably consider the case of a turbomachine having a maximum thrust between 100 kN and 300 kN, with a fan 12 having a diameter between 2 and 3 m, and a reduction gear having a reduction ratio between 2.5 and 5. In this case, the maximum input torque of the input shaft 26 of the reduction gear 20 is comprised between 15,000 and 50,000 N·m. The maximum output torque of the reduction gear 20 is comprised between 50,000 and 170,000 N·m.

In this configuration, non-limitingly with respect to the invention, the value of the determined uncoupling torque in all three embodiments of the uncoupling means 28 therefore varies substantially between 50,000 N·m and 400,000 N·m.

In this configuration, non-limitingly with respect to the invention, the value of the determined uncoupling torque $C_D$ in all three embodiments of the additional uncoupling means 28' therefore varies substantially between 60,000 N·m and 500,000 N·m.

Of course it will be understood that these values are only indicative and depend both on the type of blade used, on the architecture and the dimensioning of the engine.

It will be understood that from the moment when the fan 12 is uncoupled from the turbine shaft 16, the turbine 16 is no longer subject to a resistant torque from said fan. There is therefore a risk of run-off of the turbine and the reduction gear 20 if the reduction gear 20 is not uncoupled. This run-off of the reduction gear 20 risks stressing it at speeds for which it is not provided to operate.

It will be noted that another essential advantage of the positioning of the fuse connecting element 30, 30' 30" between the reduction device 20 and the turbine shaft 16 is therefore to allow protection of the reduction device 20 in the case of run-off of the turbine, the latter no longer risking being subject to high speeds of rotation for which it would not be intended.

However, according to the invention, the turbomachine or turbine engine 10 includes means for detecting uncoupling of the reduction device 20 and of the turbine shaft 16 able to control at least a reduction of speed of the turbine, or even a complete stopping of the turbine engine.

Thus, it is known how to measure the speed of the turbine shaft 16 with a speed sensor. Detection of the runaway of the measured speed may thus be interpreted as an uncoupling and trigger the activation of regulation members of the engine. Consequently, it is possible to limit the fuel flow rate in order to cause drop of the speed of the turbine, or, if one has a turbine comprising an axial brake between a rotor portion and a stator portion, to active this brake in order to slow down and/or stop the turbine.

Figure 5:
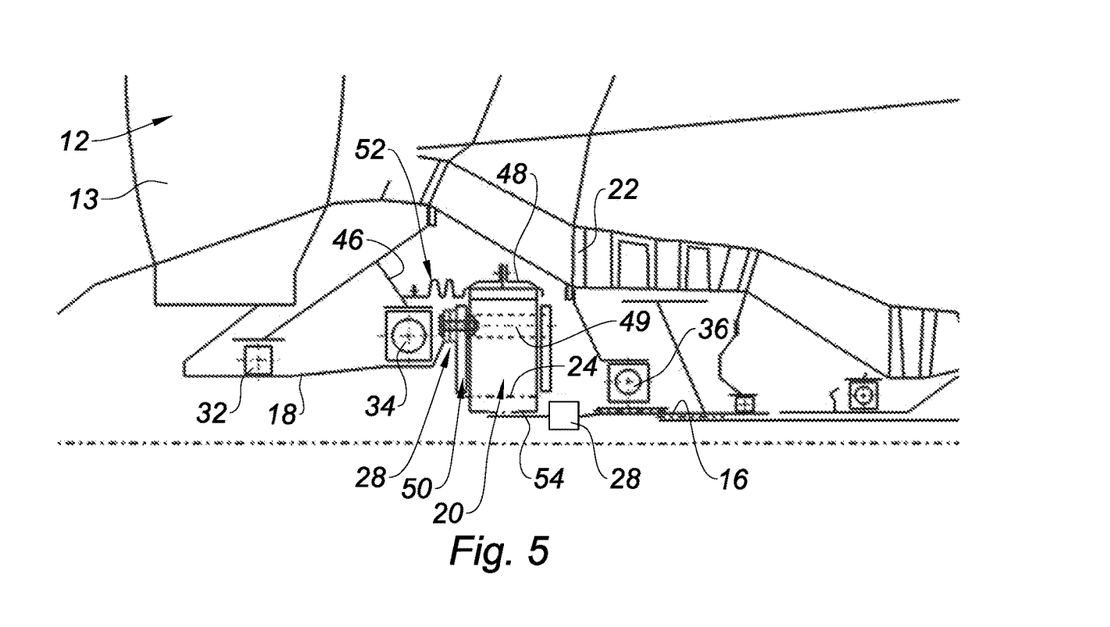
FIG. 5 is a schematic sectional view of the front portion of a turbomachine according to the invention equipped with a second embodiment of an additional uncoupling means.

As illustrated in FIG. 5, this design may advantageously be further improved by adding an additional uncoupling means 28' interposed between the reduction device 20 and the fan 12 shaft 18, which is able to uncouple the reduction device 20 and the fan shaft 18 in response to exceeding a determined resistant torque $C_D'$, called uncoupling torque, exerted by the fan shaft 18 on the reduction device 20. This configuration advantageously makes it possible to ensure total uncoupling of the reduction gear 20, on the side of the turbine shaft 16 as previously seen, but also on the side of the fan 12 shaft 18, which makes it possible to prevent any of the internal members of the reduction gear 20 from being subjected to an excessive speed and consequently makes it possible to avoid any risk of blow out of the reduction gear 20.

As illustrated in FIG. 5, the reduction gear 20 is also connected to a case 46 of the turbomachine by at least one of its members. For example, non-limitingly with respect to the invention, as illustrated in FIG. 5, a crown 48 of the reduction gear 20 is connected to the case 46 via a flexible link made up of an axially deformable crown support 52, while a planet carrier of the reduction gear 20 is coupled to this fan shaft 18 and a sun gear is coupled to the turbine shaft 16 via a set of complementary splines 54. It will be understood that this arrangement is not limiting with respect to the invention and that the elements of the reduction gear could be linked differently to the case 46, the fan shaft 18, and the turbine shaft 16.

For example, in the same manner as the arrangement known from the state of the art that was described in reference to FIG. 1, a crown 48 of the reduction tour 20 could be coupled to the fan shaft 18, while a planet carrier of the reduction gear 20 would be connected to the case 46 via an axially deformable support, and a sun gear 24 would be coupled to the turbine shaft 16 via a set of splines.

This configuration makes it possible to guarantee that, once the reduction gear 20 has been uncoupled from the turbine shaft 16 and the fan shaft 18, it nevertheless continues to be maintained in the case 46 of the turbomachine.

FIG. 5 shows the uncoupling means 28' in the form of a coupling with trapezoidal teeth of the "curvic" type, but it will also be understood that this arrangement is not limiting with respect to the invention, and that, as will be seen in the continuation of the present description, the uncoupling means 28' can assume other forms.

Like the uncoupling means 28, the additional uncoupling means 28' includes at least one fuse connecting element 31, 31', 31" which is interposed between the reduction device 20 and the fan shaft 18 and which is able to be broken when it is subject to the uncoupling resistant torque $C_D$ exerted by the fan shaft 18 on the reduction device 20.

Figures 6, 7:
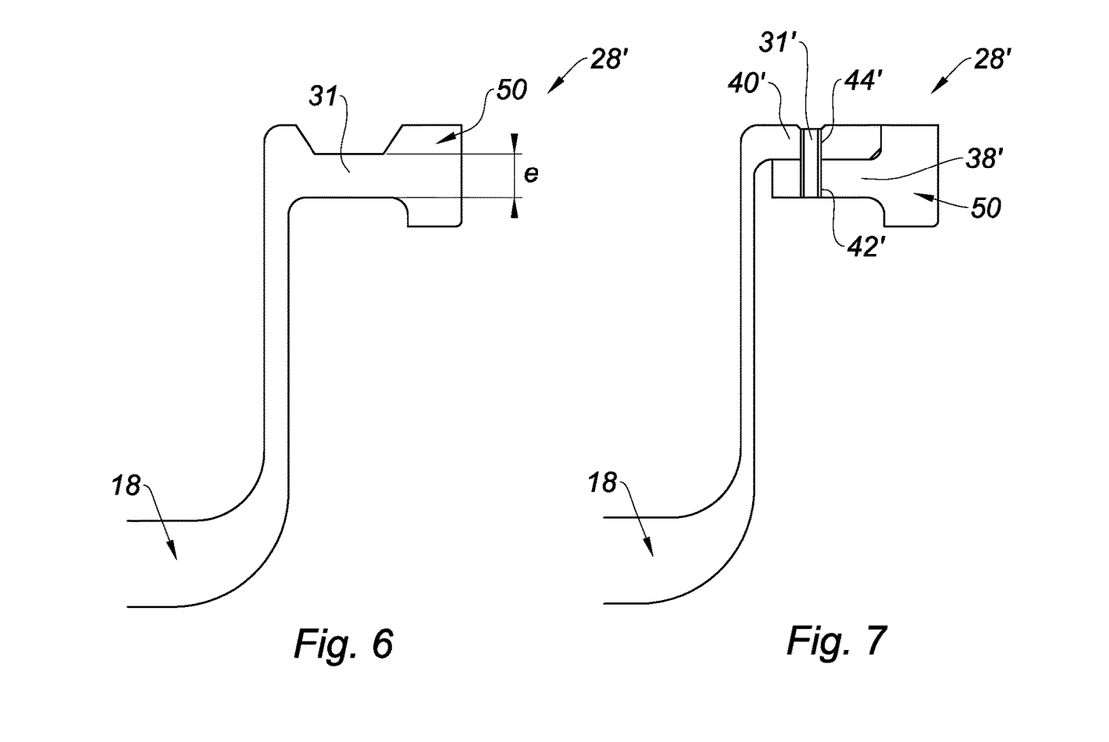
FIG. 6 is a detail view of a first embodiment of the additional uncoupling means.
FIG. 7 is a detail view of a second embodiment of the additional uncoupling means.

According to a first embodiment of the decoupling device 28 which was illustrated in FIG. 6, the fuse element for example consists of a segment 31 of the fan shaft 18 that is bound to an output shaft 50 of the reduction device 20. This segment 31 is able to be broken when it is subject to a maximum torsional torque corresponding to the determined uncoupling resistant torque exerted by the reduction device 20 on the shaft 18.

The output shaft 50 of the reduction device 20 and the fan shaft 18 can be fixed to one another using any means known from the state of the art. However, preferably, in this first embodiment, the output shaft 50 of the reduction device 20 and the fan shaft 18 are combined and form a single and same part.

Any known solution of the state of the art may be suitable for properly producing a segment 31 with reduced torsional rigidity. In particular, the segment may be a tubular segment with reduced thickness "e", as illustrated in FIG. 6. This may also be an open-worked segment 31 and/or including areas for initiating the break (not shown).

According to a second embodiment of the uncoupling device 28 which has been illustrated in FIG. 7, the output shaft 50 of the reduction device includes a tubular end segment 38 which is uncoupled with a complementary tubular end segment 40 of the fan shaft 18 via at least one radial element 31', forming the fuse connecting element. This radial element 31' is able to be broken when it is subject to a shear stress corresponding to the resistant uncoupling torque $C_D$.

It will be understood that the radial element 31' forming the fuse element may be conformed according to many embodiments. However, in a preferential way of the invention, the radial element 31' consists of a pin, notably a cylindrical pin which is received in a radial orifice 42 of the end segment 38' of the output shaft 50 and into an orifice 44' facing the end segment of the fan shaft 18.

According to a third embodiment of the uncoupling device 28 which has been illustrated in detail in FIG. 8A, the reduction device 20 is coupled to the fan shaft 18 via a coupling 17 with trapezoidal teeth of the "curvic" type. More particularly, this coupling 17 is inserted between the output shaft 50 of the reduction gear 20, configured in the form of a flange, and the fan shaft 18. It includes two toothed coupling plates 19A, 19B including trapezoidal teeth 21A, 21B, whereof the direction of the height of the corresponding trapezoids is oriented parallel to the axial direction, and which mesh with one another. The teeth 21A, 21B have inclined planes 27A, 27B arranged in contact with one another. The plates 19A, 19B and the shaft 50 are configured in a flange joined to one another by axial screws. It will be understood that alternatively, the plate 19B could be formed in a single piece with the output shaft 50 configured in a flange.

Like for the uncoupling means 28, the screws are axial fuse screws 31" that traverse piercings 23A, 23B arranged substantially along an intermediate radius R of the teeth 21A, 21B, substantially at the middle of said teeth. The axial fuse screws 31" each form the fuse connecting element of the uncoupling means 28". As illustrated in FIGS. 8A and 8B, a functional clearance J is arranged between the ends of the teeth 21A and the bottoms of the teeth 21B to guarantee good contact between the inclined planes 27A, 27B.

More particularly, as illustrated in FIG. 8B, the axial fuse screws 31", with primary diameter "D", each include a segment 25 with a reduced diameter "d" forming a break primer. As illustrated in FIG. 8C, when such a coupling undergoes a torsional torque between its two plates 19A, 19B, the trapezoidal teeth 21A, 21B, via their inclined faces 27A, 27B, convert the forces resulting from the torsional torque into a resultant axial force F between the plates 19A, 19B that is exerted in the form of a traction force on the screws 31". This traction force results in causing the screws 31" to break at their segments 25 having a smaller diameter. It will be understood that, like for the uncoupling means 28, the number and diameter of the fuse screws 31" depends on the value of the uncoupling torque $C_D$.

In general, in the case of a reduction gear 20 of the planetary or epicycloidal type, the input shaft 26 is mounted in an input member of this reduction gear 20 via a set 54 of complementary splines inserted between the input shaft 26 of the reduction gear and the input member of the reduction gear. The reduction gear 20 also includes another member fixed to the case 46 with axial mobility, and lastly an axially fixed output member.

For example, and non-limitingly with respect to the invention, the reduction gear 20 shown in FIG. 5 includes a sun gear 24 (shown by the outline of its teeth), which receives, via the set of complementary splines 54, the input shaft 26 of the reduction gear. The reduction gear 20 includes a planet carrier 49 (shown by the outline of the axes of its planet gears) that meshes with the sun gear and with a crown 48, fixed to the case 46 of the turbomachine via an axially deformable support 52.

The forces resulting from the torsional torque exerted between the plates 19A, 19B cause a resultant axial force between these plates 19A, 19B that results in causing their separation. This separation continues after the fuse screws 30" break during the separation of the plates 19A, 19B. The possibility of sliding offered by the set 54 of complementary splines of the sun gear 24 and the input shaft 26, and by the support 52 of the crown 48, which is axially deformable, allows the separation of output input shaft 50, which accompanies the reduction gear 20, from the shaft 18 of the fan 12.

Like for the uncoupling means 28, the break of the fuse connecting element 31, 31', 31" of the uncoupling means 28" can be provided a minima, once a single blade 13 is lost. This configuration is not limiting with respect to the invention, and the loss of a larger number of blades could be tolerated.

Conversely, if it is provided that the break of the fuse connecting element 31, 31', 31" only occurs in the case of break or loss of a blade 13, it is provided that this break does not occur in the case of a simple slowing down of the fan 12.

Thus, it is provided that the determined resistant torque be strictly greater than any torque corresponding to a resistant torque exerted by the fan 12 on the speed reduction device 20, in the case of ingestion of a bird without any loss of a blade by said fan 12, such an event may produce a tangential force slowing down the fan 12, but which does not risk damaging the reduction device 20 or blocking the relevant kinematical chain. In this case, such an event does not cause the break of the fuse connecting element 31, 31', 31".

The break is, however, anticipated for an event corresponding to a determined percentage of the maximum torque to which the shaft 18 of the fan 12 is subjected. For example, it is possible to tare the break torque $C_D'$ to respond to the loss of a blade, as previously seen. In the aforementioned configuration of the turbomachine, this torque $C_D'$ is then situated in a range from 120% to 200% of the maximum torque to which the shaft 18 of the fan 12 is subjected.

It is also possible to choose another break criterion of the fuse connecting element 31, 31', 31", for example seizing of the reduction gear 20. In this case, the torque $C_D$ is situated in a range from 200% to 300% of the maximum torque to which the shaft 18 of the fan 12 is subjected.

Of course it will be understood that these values are only indicative and depend on the dimensioning of the turbomachine.

Like for the uncoupling means 28, means for detecting uncoupling of the reduction device 20 and the fan shaft 18 by the uncoupling means 28' can be provided to control at least a reduction of speed of the turbine, or even a complete stopping of the turbine engine.

Thus, it is possible to measure the speed of the output shaft 50 of the reduction gear 20. Detection of the runaway of this speed relative to that of the fan 12 may thus be interpreted as an uncoupling and trigger the activation of regulation members of the engine. Consequently, it is possible to limit the fuel flow rate in order to cause drop of the speed of the turbine, and if one has a turbine comprising an axial brake between a rotor portion and a stator portion, to active this brake in order to slow down and/or stop the turbine.

The triggering of the break of the fuse connecting element 31, 31', 31" of the uncoupling means 28' may or may not be simultaneous with that of the fuse element 30, 30', 30" of the uncoupling means 28. Preferably, elements 30, 30', 30" and 31, 31', 31" will be chosen whose strength is tuned so as to offer simultaneous uncoupling of the input shaft 26 and the output shaft 50 of the reduction gear 20, so as to completely uncouple the reduction gear from the kinematic chain in order to reduce the speed of its internal members as quickly as possible and thus avoid any risk of blow out. However, it will be understood that this arrangement is not limiting with respect to the invention and that the fuse elements 30, 30', 30", 31", 31, 31', 31" can break when they are subjected to different respective torques $C_D$, $C_D'$.

Thus, depending on the available space in the case 46 of the turbomachine to respectively house the uncoupling means 28, 28' therein and based on the respective uncoupling torques $C_D$, $C_D'$ of these uncoupling means, it is possible to combine the fuse elements 30, 30', 30", 31", 31, 31', 31".

According to a first combination, the input shaft segment 30 of the reduction device 20 is combined with the segment 31 of the output shaft 50 of the reduction device 20.

According to a second combination, the input shaft segment 30 of the reduction device 20 is combined with the radial element 31' inserted between the end segment 40' of the fan shaft 18 and the output shaft 50 of the reduction device 20.

According to a third combination, the input shaft segment 30 of the reduction device 20 is combined with the axial fuse screws 31" of the curvic-type coupling inserted between the output shaft 50 of the reduction gear 20 and the fan shaft 18.

According to a fourth combination, the radial element 30' inserted between the input shaft 26 of the reduction device 20 and the tubular end segment 40 of the turbine shaft 16 is combined with the segment 31 of the output shaft 50 of the reduction device 20.

According to a fifth combination, the radial element 30' inserted between the input shaft 26 of the reduction device 20 and the tubular end segment 40 of the turbine shaft 16 is combined with the radial element 31' inserted between the end segment 40' of the fan shaft 18 and the shaft 50 of the reduction device 20.

According to a sixth combination, the radial element 30' inserted between the input shaft 26 of the reduction device 20 and the tubular end segment 40 of the turbine shaft 16 is combined with the axial fuse screws 31" of the curvic-type coupling inserted between the output shaft 50 of the reduction device 20 and the fan shaft 18.

According to a seventh combination, the axial fuse screws 30" of the curvic-type coupling inserted between the input shaft 26 of the reduction gear 20 and the turbine shaft 16 are combined with the segment 31 of the output shaft 50 of the reduction device 20.

According to an eighth combination, the axial fuse screws 30" of the curvic-type coupling inserted between the input shaft 26 of the reduction device 20 and the turbine shaft 16 are combined with the radial element 31' inserted between the end segment 40' of the fan shaft 18 and the shaft 50 of the reduction device 20.

According to a ninth combination, the axial fuse screws 30" of the curvic-type coupling inserted between the input shaft 26 of the reduction device 20 and the turbine shaft 16 are combined with the axial fuse screws 31" of the curvic-type coupling inserted between the output shaft 50 of the reduction device 20 and the fan shaft 18.

The invention therefore provides a safe solution to the risks of excess speed of the kinematic line between a fan and a turbine shaft of a turbomachine, in particular in case of fan blade break of the turbomachine.

Finally, the invention also gives the possibility, by limiting the torque transmitted to the reduction device 20, of avoiding any over-dimensioning of the members of the reduction device 20, the fan shaft 18, and the low pressure turbine shaft 16 in order to overcome the known risks of increase of said torque in the case of a blade loss. As these members no longer need to be over-dimensioned for meeting the high torsional constraints, they may have their dimensioning reduced, which has the consequence of globally alleviating the design of the reduction device 20, the fan shaft 18 and the LP turbine shaft 16.

While illustrative embodiments have been illustrated and described, it will be appreciated that various changes can be made therein without departing from the spirit and scope of the invention.

The invention claimed is:

1. A turbomachine, comprising a fan including composite blades and a fan shaft driven by a turbine shaft via a reduction device, said reduction device being configured to reduce a speed of rotation and comprising an input shaft coupled to the turbine shaft, the input shaft including an uncoupling device configured to uncouple the reduction device and the turbine shaft in response to the exceeding of a predetermined maximum resistant torque exerted by the reduction device on the turbine shaft,
wherein the uncoupling device includes at least one first fuse element integral to the input shaft and configured to be broken when the at least one first fuse element is subjected to the predetermined maximum resistant torque exerted by the speed reduction device on the turbine shaft,
wherein the predetermined maximum resistant torque corresponds to a resistant torque which is exerted by the fan on the speed reduction device in the case of loss of at least one of the composite blades of the fan,
and which, as being associated to the fan having composite blades, is comprised between 130% and 170% of a normal torque under maximum speed conditions of the turbomachine.

2. The turbomachine according to claim 1, wherein the at least one first fuse element comprises a tubular portion of the input shaft with a reduced thickness.

3. The turbomachine according to claim 1, wherein the turbomachine includes means for detecting an uncoupling of the reduction device and of the turbine shaft and able to control a reduction of speed of the turbine and/or a stopping of the turbomachine.

4. The turbomachine according to claim 1, wherein the turbomachine includes an additional uncoupling device interposed between the reduction device and the shaft of the fan, which is configured to uncouple the reduction device and the fan shaft in response to exceeding a predetermined maximum resistant torque exerted by the fan shaft on the reduction device.

5. The turbomachine according to claim 4, wherein the additional uncoupling device includes at least one second fuse element interposed between the reduction device and the fan shaft and which is configured to be broken when it is subject to the predetermined maximum resistant torque exerted by fan shaft on the speed reduction device.

6. The turbomachine according to claim 5, wherein the at least one second fuse element comprises a segment of the input shaft of the reduction device bound to the shaft of the fan, said segment being configured to be broken when it is subject to a maximum torsional torque corresponding to the predetermined maximum resistant torque.

7. The turbomachine according to claim 5, wherein an output shaft of the reduction device includes a tubular end segment which is coupled with a complementary tubular end segment of the fan shaft via at least one radial fuse connecting element which forms the at least one second fuse element and which is configured to be broken when subject to a shear stress corresponding to the predetermined maximum resistant torque.

8. The turbomachine according to claim 7, wherein the at least one radial fuse connecting element includes a pin which is received in a radial orifice of the end segment of the output shaft and in an orifice facing the end segment of the fan shaft.

9. A turbomachine, comprising a fan including blades and a fan shaft driven by a turbine shaft via a reduction device configured to reduce a speed of rotation and comprising an input shaft coupled to the turbine shaft, the input shaft including an uncoupling device configured to uncouple the reduction device and the turbine shaft in response to the exceeding of a predetermined maximum resistant torque exerted by the reduction device on the turbine shaft,
wherein the uncoupling device includes at least one first fuse element integral to the input shaft and configured to be broken when the at least one first fuse element is subjected to the predetermined maximum resistant torque exerted by the speed reduction device on the turbine shaft,
wherein the predetermined maximum resistant torque corresponds to a resistant torque which is exerted by the fan on the speed reduction device in the case of loss of at least one blade, and which is greater than 50,000 N·m.

10. The turbomachine according to claim 9, wherein the at least one first fuse element comprises a tubular portion of the input shaft having a reduced thickness.

11. The turbomachine according to claim 9, wherein the turbomachine includes means for detecting uncoupling of the reduction device and of the turbine shaft and able to control a reduction of speed of the turbine and/or a stopping of the turbomachine.

12. The turbomachine according to claim 9, wherein the turbomachine includes an additional uncoupling device interposed between the reduction device and the shaft of the fan, which is configured to uncouple the reduction device and the fan shaft in response to exceeding a predetermined maximum resistant torque exerted by the fan shaft on the reduction device.

13. The turbomachine according to claim 12, wherein the additional uncoupling device includes at least one second fuse element which is interposed between the reduction device and the fan shaft and which is configured to be broken when it is subject to the predetermined maximum resistant torque exerted by fan shaft on the speed reduction device.

14. The turbomachine according to claim 13, wherein the at least one second fuse element comprises a segment of the input shaft of the reduction device bound to the shaft of the fan, said segment being configured to be broken when it is subject to a maximum torsional torque corresponding to the predetermined maximum resistant torque.

15. The turbomachine according to claim 13, wherein an output shaft of the reduction device includes a tubular end segment which is coupled with a complementary tubular end segment of the fan shaft via at least one radial fuse connecting element which forms the at least one second fuse element and which is configured to be broken when subject to a shear stress corresponding to the predetermined maximum resistant torque.

16. The turbomachine according to claim 15, wherein the at least one radial fuse connecting element includes a pin which is received in a radial orifice of the end segment of the output shaft and in an orifice facing the end segment of the fan shaft.

17. The turbomachine according to claim 13, wherein the reduction device is coupled to the fan shaft via a coupling with trapezoidal teeth of the curvic type, including two toothed coupling plates with trapezoidal teeth meshing with one another and fastened to one another via axial fuse screws forming the at least one second fuse connecting element of the additional uncoupling device.

18. A turbomachine, comprising a fan including metal blades and a fan shaft driven by a turbine shaft via a reduction device configured to reduce a speed of rotation and comprising an input shaft coupled to the turbine shaft, the input shaft including an uncoupling device configured to uncouple the reduction device and the turbine shaft in response to the exceeding of a predetermined maximum resistant torque exerted by the reduction device on the turbine shaft,
wherein the uncoupling device includes at least one first fuse element integral to the input shaft and configured to be broken when the at least one first fuse element is subjected to the predetermined maximum resistant torque exerted by the speed reduction device on the turbine shaft,
wherein the predetermined maximum resistant torque corresponds to a resistant torque which is exerted by the fan on the speed reduction device in the case of loss of at least one metal blade of the fan, and which, as being associated to the fan having metal blades, is comprised between 120% and 140% of a normal torque under maximum speed conditions of the turbomachine.

19. The turbomachine according to claim 18, wherein the at least one first fuse element comprises a tubular portion of the input shaft with a reduced thickness.

20. The turbomachine according to claim 18, wherein the turbomachine includes means for detecting uncoupling of the reduction device and of the turbine shaft able to control a reduction of speed of the turbine and/or a stopping of the turbomachine.

21. The turbomachine according to claim 18, wherein the turbomachine includes an additional uncoupling device interposed between the reduction device and the shaft of the fan, which is configured to uncouple the reduction device and the fan shaft in response to exceeding a predetermined maximum resistant torque exerted by the fan shaft on the reduction device.

22. The turbomachine according to claim 18, wherein the additional uncoupling device includes at least one second fuse element which is interposed between the reduction device and the fan shaft and which is configured to be broken when it is subject to the predetermined maximum resistant torque exerted by fan shaft on the speed reduction device.

23. The turbomachine according to claim 22, wherein the at least one second fuse element comprises a segment of the input shaft of the reduction device bound to the shaft of the fan, said segment being configured to be broken when it is subject to a maximum torsional torque corresponding to the predetermined maximum resistant torque.

24. The turbomachine according to claim 22, wherein an output shaft of the reduction device includes a tubular end segment which is coupled with a complementary tubular end segment of the fan shaft via at least one radial fuse connecting element which forms the at least one second fuse element and which is configured to be broken when subject to a shear stress corresponding to the predetermined maximum resistant torque.

25. The turbomachine according to claim 24, wherein the at least one radial fuse connecting element includes a pin which is received in a radial orifice of the end segment of the output shaft and in an orifice facing the end segment of the fan shaft.

26. The turbomachine according to claim 22, wherein the reduction device is coupled to the fan shaft via a coupling with trapezoidal teeth of the curvic type, including two toothed coupling plates with trapezoidal teeth meshing with one another and fastened to one another via axial fuse screws forming the at least one second fuse element of the additional uncoupling device.

* * * * *